(12) United States Patent
Ming et al.

(10) Patent No.: US 9,671,088 B2
(45) Date of Patent: Jun. 6, 2017

(54) LENS AND ILLUMINATION DEVICE INCLUDING THE LENS

(71) Applicant: OSRAM GmbH, Munich (DE)

(72) Inventors: Yusheng Ming, Shenzhen (CN); Zhijun Ou, Shenzhen (CN); Guangwei Chi, Shenzhen (CN); Jing Lin, Shenzhen (CN)

(73) Assignee: OSRAM GMBH, Munich (DE)

(*) Notice: Subject to any disclaimer, the term of this patent is extended or adjusted under 35 U.S.C. 154(b) by 0 days.

(21) Appl. No.: 14/763,837

(22) PCT Filed: Dec. 19, 2013

(86) PCT No.: PCT/EP2013/077494
§ 371 (c)(1),
(2) Date: Jul. 28, 2015

(87) PCT Pub. No.: WO2014/117906
PCT Pub. Date: Aug. 7, 2014

(65) Prior Publication Data
US 2015/0362153 A1 Dec. 17, 2015

(30) Foreign Application Priority Data
Jan. 31, 2013 (CN) .......................... 2013 1 0040903

(51) Int. Cl.
*F21V 1/00* (2006.01)
*F21V 11/00* (2015.01)
(Continued)

(52) U.S. Cl.
CPC ................ *F21V 13/04* (2013.01); *F21V 5/04* (2013.01); *F21V 5/046* (2013.01); *F21V 7/0091* (2013.01);
(Continued)

(58) Field of Classification Search
CPC .......... F21V 13/04; F21V 5/04; F21V 7/0091; F21Y 2101/02; G02B 19/0066; G02B 19/0028; G02B 19/0061
See application file for complete search history.

(56) References Cited

U.S. PATENT DOCUMENTS 5,757,557 A * 5/1998 Medvedev .............. F21L 4/027
359/708
5,813,743 A * 9/1998 Naka .................... F21S 48/1329
362/16
(Continued)

OTHER PUBLICATIONS

International Search Report based on Application No. PCT/EP2013/077494 (4 Pages) dated Feb. 26, 2014 (Reference Purpose Only).

*Primary Examiner* — Andrew Coughlin
*Assistant Examiner* — Alexander Garlen
(74) *Attorney, Agent, or Firm* — Viering, Jentschura & Partner mbB

(57) ABSTRACT

Various embodiments may relate to a lens for an illumination device, including an incident surface, an emergent surface, and a reflective surface connected between the incident surface and the emergent surface. The lens includes a first axis as an optical axis of the lens, a second axis perpendicular to the first axis and extending in a longitudinal direction of the lens, the first axis and the second axis defining a symmetrical surface of the lens, and a third axis perpendicular to the symmetrical surface, a first portion of light from a light source is incident upon the incident surface, refracted by the emergent surface, and then emerges to form a first light beam, and a second portion of light from the light source is incident upon the incident surface, reflected by the reflective surface, refracted by the emergent surface, and then emerges to form a second light beam.

17 Claims, 6 Drawing Sheets

(51) Int. Cl.
  *F21V 13/04* (2006.01)
  *G02B 19/00* (2006.01)
  *F21V 7/00* (2006.01)
  *F21V 5/04* (2006.01)
  *F21Y 101/00* (2016.01)

(52) U.S. Cl.
  CPC ..... *G02B 19/0028* (2013.01); *G02B 19/0061* (2013.01); *G02B 19/0066* (2013.01); *F21Y 2101/00* (2013.01)

(56) References Cited

U.S. PATENT DOCUMENTS

| | | | |
|---|---|---|---|
| 6,547,423 B2* | 4/2003 | Marshall | F21V 5/04 257/E33.072 |
| 6,819,506 B1 | 11/2004 | Taylor et al. | |
| 7,222,995 B1* | 5/2007 | Bayat | F21L 4/027 359/728 |
| 7,401,948 B2* | 7/2008 | Chinniah | F21V 5/04 362/310 |
| 7,918,583 B2* | 4/2011 | Chakmakjian | F21V 5/007 362/237 |
| 2010/0128233 A1* | 5/2010 | Liu | G03B 21/28 353/98 |
| 2011/0026247 A1 | 2/2011 | Zhang et al. | |
| 2012/0113653 A1* | 5/2012 | Koizumi | F21V 5/04 362/327 |
| 2012/0169235 A1* | 7/2012 | Dassanayake | F21K 9/137 315/113 |

\* cited by examiner

LENS AND ILLUMINATION DEVICE INCLUDING THE LENS

RELATED APPLICATIONS

The present application is a national stage entry according to 35 U.S.C. §371 of PCT application No.: PCT/EP2013/077494 filed on Dec. 19, 2013, which claims priority from Chinese application No.: 201310040903.8 filed on Jan. 31, 2013, and is incorporated herein by reference in its entirety.

TECHNICAL FIELD

Various embodiments may relate to a lens for an illumination device. In addition, various embodiments further relate to an illumination device including the lens.

BACKGROUND

During the marketing process of goods, in order to attract customers, the merchants usually display the goods in the display cabinets and use lamplight to illuminate them, in order to highlight the characteristics of the goods, or use light boxes for advertising. Usually lamplight is used to illuminate the goods in the display cabinets or the light boxes. With the development of LED technology, people more and more frequently use LED light sources to replace the traditional illumination devices. However, due to the characteristics of the LED light sources, it is necessary to perform secondary optical processing on the light emitted by them, then it is necessary to equip them with an optical lens, so as to meet the illumination requirements of the light boxes.

A light box usually comprises a bottom surface, a top surface arranged to be opposite to the bottom surface, and a plurality of side surfaces connected between the bottom surface and the top surface, wherein the lens is arranged on the bottom surface, thereby causing the light from the light source to illuminate, after the secondary optical processing by the lens, the top surface and the side surfaces. However, as is known to all, usually no advertising characters or patterns are arranged on the top surface of the light box. Thus, there is no need to illuminate the region of the top surface. The traditional lens cannot avoid illuminating this region, resulting in unnecessary light loss.

SUMMARY

In order to solve the above technical problem, various embodiments provide a lens for an illumination device. The lens is capable of causing a light source to illuminate, according to the illumination requirements of the light box, a particular region without illuminating the region which does not need to be illuminated, thereby avoiding unnecessary light loss. In addition, various embodiments also provide an illumination device including the lens, especially a light box.

Various embodiments provide a lens for an illumination device, including an incident surface, an emergent surface, and a reflective surface connected between the incident surface and the emergent surface, wherein the lens includes: a first axis as an optical axis of the lens; a second axis perpendicular to the first axis and extending in a longitudinal extending direction of the lens, wherein the first axis and the second axis define a symmetrical surface of the lens; and a third axis perpendicular to the symmetrical surface, wherein a first portion of light from a light source is incident upon the incident surface, refracted by the emergent surface, and then emerges to form a first light beam, and a second portion of light from the light source is incident upon the incident surface, reflected by the reflective surface, refracted by the emergent surface, and then emerges to form a second light beam, wherein the first light beam and the second light beam emerge in a direction away from the symmetrical surface, such that, viewed from a cross section perpendicular to the symmetrical surface, no emergent light exists in a predetermined angle range on two sides of the symmetrical surface. The light emerging through the lens according to various embodiments forms substantially fork-shaped light beams, that is, no emergent light exists in the predetermined regions on the two sides of the symmetrical surface of the lens, thus, no light will go to the region which is exactly opposite to the lens, instead, the light is deflected to the regions on the two sides of the lens, thereby achieving illumination of a particular region.

According to various embodiments, the incident surface, the emergent surface and the reflective surface are configured in such a manner that, viewed from a cross section perpendicular to the symmetrical surface, the first light beam and the second light beam respectively form light beam branches on two sides of the symmetrical surface. In various embodiments, since the lens itself is in mirror symmetry about the symmetrical surface going through the center of the lens, on one side of the lens, there will emerge the first light beam and the second light beam, and similarly, on the other side of the lens, there will emerge other first light beam and second light beam that are respectively symmetrical with the first light beam and the second light beam. In this way, the first light beams form fork-shaped light beam branches, and the second light beams also form fork-shaped light beam branches, and these first and second light beam branches can at least partially overlap.

Further according to various embodiments, the illumination device includes a lamp cover, the lens is arranged in the lamp cover, the lamp cover includes a bottom surface, a top surface arranged to be opposite to the bottom surface, and at least two side surfaces connected between the bottom surface and the top surface, wherein the lens is arranged on the bottom surface, and wherein the predetermined angle range is defined by a width of the top surface on the third axis. As the light emerging from the lens is deflected away from the symmetrical surface of the lens, in fact, the region which the light emerging from the lens needs to illuminate is merely partial region of the side surface of the lamp cover. Further, in the design of the lens according to various embodiments, it is necessary to design the lens according to the size of the light box to which the lens is applied. Thus, the region of the top surface of the lamp cover is the region which the light emerging from the lens does not need to illuminate.

In various embodiments, the incident surface includes a first incident surface portion, and second incident surface portions on two sides of the first incident surface portion, wherein the first incident surface portion and the second incident surface portions define an accommodation cavity accommodating the light source. In order to enable all the light from the light source to enter the lens through the incident surface, it is necessary to form an accommodation cavity at the bottom of the lens. In fact, the second incident surface portion of the incident surface of the lens can be designed as a vertical surface perpendicular to the mounting surface of the light source.

In various embodiments, the first incident surface portion is configured in such a manner that the first portion of light is incident upon the first incident surface portion, refracted by the emergent surface, and then emerges to form the first light beam, and the second incident surface portion is configured in such a manner that the second portion of light is incident upon the second incident surface portion, reflected by the reflective surface, refracted by the emergent surface, and then emerges to form the second light beam. As a portion of the light from the light source cannot directly emerge through the incident surface and the emergent surface, the second incident surface portion provided can deflect this portion of light to the reflective surface after refracting it, and the reflective surface will reflect this portion of light to the emergent surface, thereby forming the second light beam.

According to various embodiments, a trend of the emergent surface in a cross section perpendicular to the symmetrical surface is determined based on the following parameters, viz. a first vertical distance from an outermost edge of the lens in a direction of the third axis to the side surface, a second vertical distance from the outermost edge of the lens to a bottom edge of a region to be illuminated of the side surface in a direction of the first axis, a third vertical distance from an edge of the incident surface in the direction of the third axis to the symmetrical surface, a fourth vertical distance from an edge of the emergent surface to the symmetrical surface, a height of the region to be illuminated of the side surface in the direction of the first axis, a first vertical height from the edge of the emergent surface to a bottom of the lens, and a second vertical height from the edge of the incident surface to the bottom of the lens. In various embodiments, the size of the lens needs to be determined in accordance with the size of the lamp cover of the illumination device to which the lens is applied, and the positional relation between the lens and the lamp cover. Here, the first vertical distance, the second vertical distance, and the height of the side surface are respectively a known quantity.

Further according to various embodiments, the lens is configured in such a manner that light emerging through the lens includes a first boundary light travelling to the bottom edge of the region to be illuminated of the side surface and a second boundary light travelling to a top edge of the region to be illuminated, wherein the first boundary light forms a first emergent angle θout1 with a first normal line at the edge of the emergent surface, and the second boundary light forms a second emergent angle θout2 with a second normal line where the emergent surface intersects the symmetrical surface. In various embodiments, as the size of the lamp cover is determined, the first emergent angle θout1 and the second emergent angle θout2 are also determined known quantities.

In various embodiments, the first boundary light forms a first incident angle θin1 with the first normal line in the lens, wherein the first incident angle θin1 is obtainable through the following formulae, viz.

$$\theta in1 = \theta x1 + \arctan\left(\frac{r2-r1}{h1-h2}\right),$$

$$\theta out1 = \theta x1 + 90 - \arctan\left(\frac{d2}{d1}\right),$$

$$\tan\theta x1 = \frac{\frac{d1}{(d1^2+d2^2)^{0.5}} - \frac{n(r2-r1)}{((h1-h2)^{0.5}+(r2-r1)^{0.5})^{0.5}}}{n\frac{h1+h2}{((h1-h2)^2+(r2-r1)^2)^{0.5}} - \frac{d2}{(d1^2+d2^2)^{0.5}}},$$

where n is refractivity of the lens, and the refractivity is obtainable according to the formula $$\frac{\sin\theta out1}{\sin\theta in1} = n,$$

and θx1 is an angle between the first normal line and the vertical direction.

Further according to various embodiments, the second boundary light forms a second incident angle θin2 with the second normal line in the lens, wherein the second incident angle θin2 is obtainable through the following formulae, viz.

$$\theta in2 = \theta x2,$$

$$\theta out2 = \theta x2 + \arctan\left(\frac{d1+r2}{d2+H}\right),$$

$$\tan\theta x2 = \frac{\frac{d1+r2}{((d2+H)^2+(d1+r2)^2)^{0.5}}}{\frac{d2+H}{((d2+H)^2+(d1+r2)^2)^{0.5-n}}},$$

where n is refractivity of the lens, and the refractivity is obtainable according to the formula $$\frac{\sin\theta out2}{\sin\theta in2} = n,$$

and θx2 is an angle between the second normal line and the vertical direction.

According to various embodiments, the emergent surface is configured, in a cross section perpendicular to the symmetrical surface, as a concave surface curved towards the incident surface or as a convex surface curved away from the incident surface.

According to various embodiments, viewed in a cross section perpendicular to the symmetrical surface, the concave surface is constituted by a first curved line and a second curved line intersecting each other, or by two intersecting straight lines. However, preferably, viewed in a cross section, the concave surface is constituted by a curved line, and such sectional profile constituted by a curved line is more favorable for the formation of fork-shaped light beams.

In various embodiments, the first curved line is obtainable through the following formulae, viz.

$f(r2)\_\text{left}=0;$ $f'(r2)\_\text{left}=-\tan \theta x1;$ $f'(0)\_\text{left}=-\tan \theta x2,$ the second curved line is obtainable through the following formulae, viz.

$f(r2)\_\text{right}=0;$ $f'(r2)\_\text{right}=\tan \theta x1;$ $f'(0)\_\text{right}=\tan \theta x2.$ In addition, the straight lines are formed in such a manner that the straight lines are straight lines between respective two endpoints of the first curved line and the second curved line. By obtaining the straight lines simply based on the first curved line and the second curved line, it is advantageous to simple manufacturing of the lens according to various embodiments.

According to various embodiments, viewed in a cross section perpendicular to the symmetrical surface, the convex surface is constituted by a third curved line and a fourth curved line, or by two intersecting straight lines.

In various embodiments, the third curved line is obtainable through the following formulae, viz.

$$f(r2)\_\text{left}=0;$$

$$f'(r2)\_\text{left}=\tan\theta x1;$$

$$f'(0)\_\text{left}=\tan\theta x2,$$

the fourth curved line is obtainable through the following formulae, viz., $$f(r2)\_\text{right}=0;$$

$$f'(r2)\_\text{right}=-\tan\theta x1;$$

$$f'(0)\_\text{right}=-\tan\theta x2.$$

In addition, the straight lines are formed in such a manner that the straight lines are straight lines between respective two endpoints of the third curved line and the fourth curved line.

According to various embodiments, the first reflective surface portion is configured as a total internally reflective surface. A portion of the light from the light source can be totally reflected by the reflective surface, which further reduces light loss of the lens according to various embodiments.

Further according to various embodiments, viewed in a cross section, the incident surface is configured as a circular arc. The simple design of circular arc further simplifies the manufacturing of the lens according to various embodiments.

Various embodiments further provide an illumination device, including a lamp cover, a lens as described above, and at least one light source, wherein the lens and the light source are arranged in the lamp cover.

In various embodiments, the light source is an LED light source. The LED light source has the advantages of long lifespan, high luminous efficiency and environmental protection.

It is to be understood that the features of the various exemplary embodiments described herein may be combined with each other, unless specifically noted otherwise.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following detailed Description, reference is made to the accompanying drawings, which form a part hereof, and in which is shown by way of illustration specific embodiments in which the invention may be practiced. In this regard, directional terminology, such as "top", "bottom" "side surface" etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
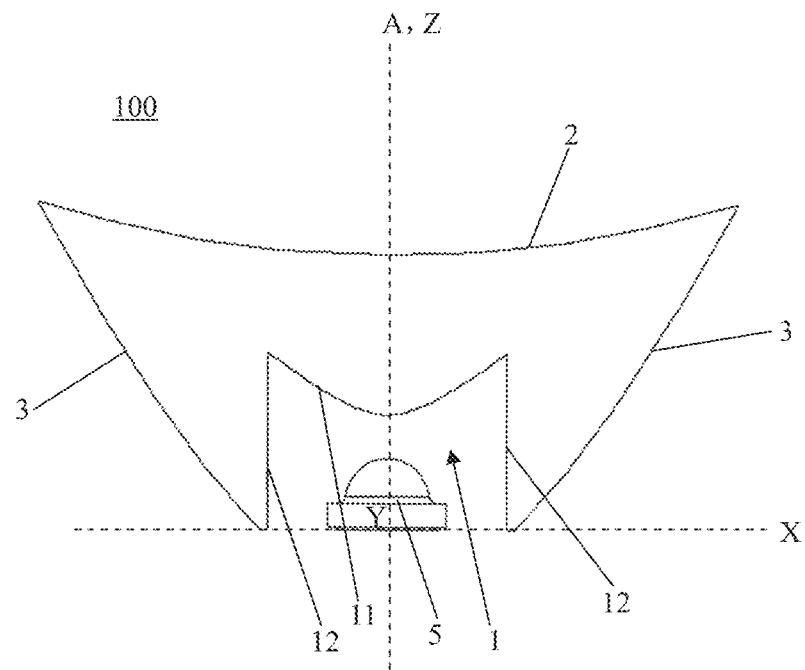
FIG. 1 is a sectional view of a variation of the first embodiment of the lens according to the present disclosure.

FIG. 1 is a sectional view of a variation of the lens 100 according to the first embodiment of the present disclosure. As can be seen from the figure, the lens 100 includes an incident surface 1, an emergent surface 2, and a reflective surface 3 connected between the incident surface 1 and the emergent surface 2, wherein the lens 100 includes: a first axis Z as an optical axis of the lens 100; a second axis Y (viz. a direction perpendicular to the paper surface in FIG. 1) perpendicular to the first axis Z and extending in a longitudinal extending direction of the lens 100, wherein the first axis Z and the second axis Y define a symmetrical surface A of the lens 100; and a third axis X perpendicular to the symmetrical surface A, wherein the incident surface 1 includes a first incident surface portion 11, and second incident surface portions 12 on two sides of the first incident surface portion 11, wherein the first incident surface portion 11 and the second incident surface portions 12 define an accommodation cavity accommodating a light source 5 which is designed as an LED light source. In addition, the reflective surface 3 is configured as a total internally reflective surface, and the first incident surface portion 11 is configured to be arc-shaped in a cross section.

Figure 2:
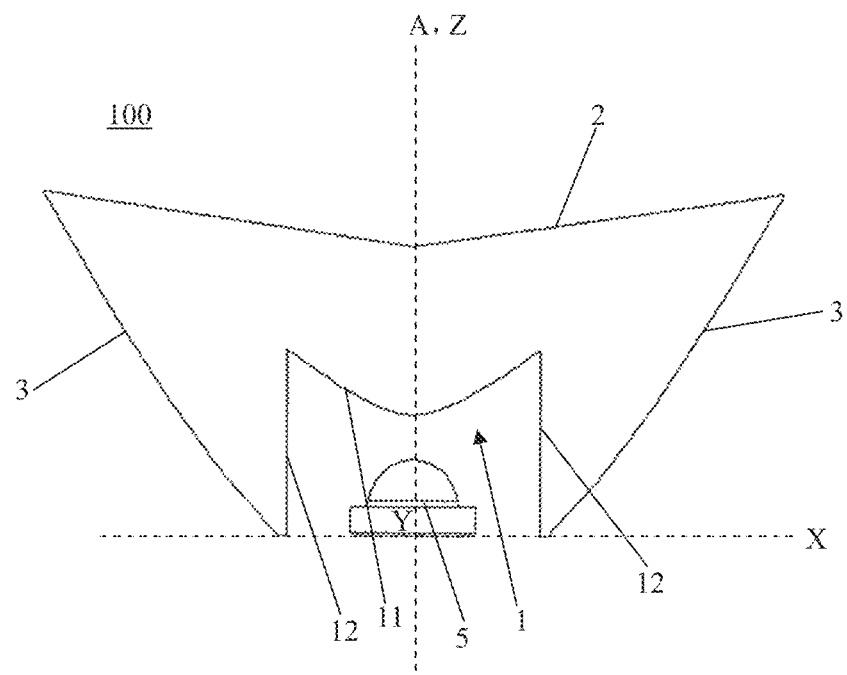
FIG. 2 is a sectional view of another variation of the first embodiment of the lens according to the present disclosure.
Figure 3:
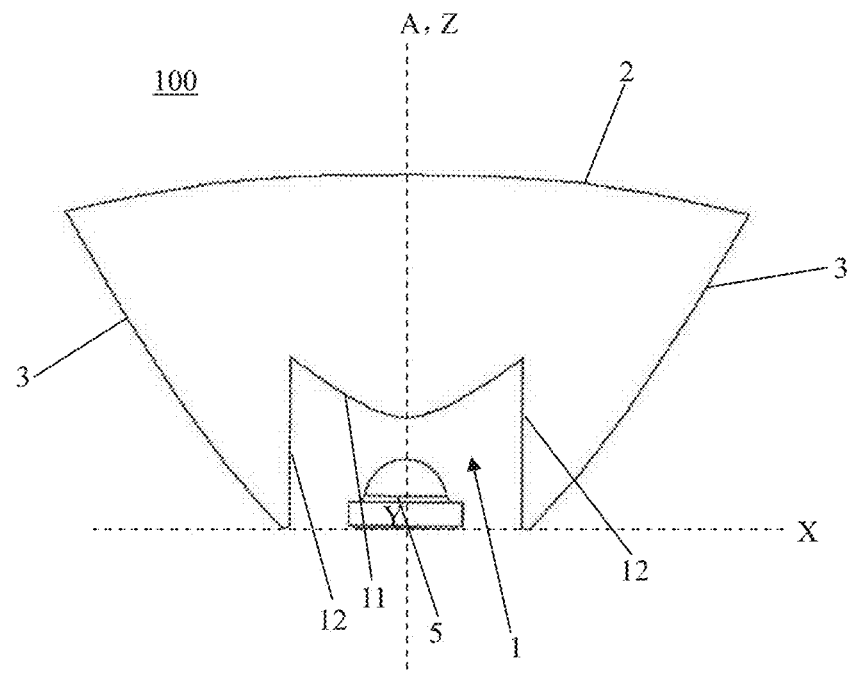
FIG. 3 is a sectional view of a variation of the second embodiment of the lens according to the present disclosure.
Figure 4:
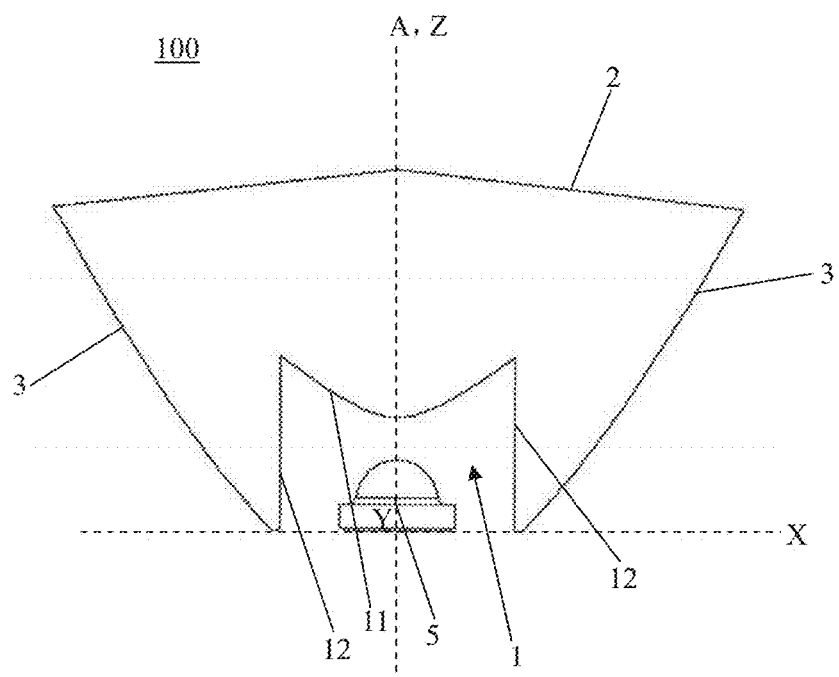
FIG. 4 is a sectional view of another variation of the second embodiment of the lens according to the present disclosure.

FIG. 2 is a sectional view of another variation of the lens 100 according to the first embodiment of the present disclosure, FIG. 3 is a sectional view of a variation of the lens 100 according to the second embodiment of the present disclosure, and FIG. 4 is a sectional view of another variation of the lens 100 according to the second embodiment of the present disclosure. The only difference between these variations and the variation shown in FIG. 1 lies in the emergent surface 2. In the first embodiment, the emergent surface 2 is configured as a concave surface curved towards the incident surface 1, while in the second embodiment, the emergent surface 2 is configured as a convex surface curved away from the incident surface 1. In addition, the difference between the variation shown in FIG. 1 and the variation shown in FIG. 2 lies in: in a cross section, the emergent surface 2 shown in FIG. 1 is a curved surface constituted by a first curved line and a second curved line, while in a cross section, the emergent surface 2 shown in FIG. 2 is constituted by two connected straight lines. The difference between the variation shown in FIG. 3 and the variation shown in FIG. 4 lies in: in a cross section, the emergent surface 2 shown in FIG. 3 is a curved surface constituted by a third curved line and a fourth curved line, while in a cross section, the emergent surface 2 shown in FIG. 4 is constituted by two connected straight lines.

Figure 5:
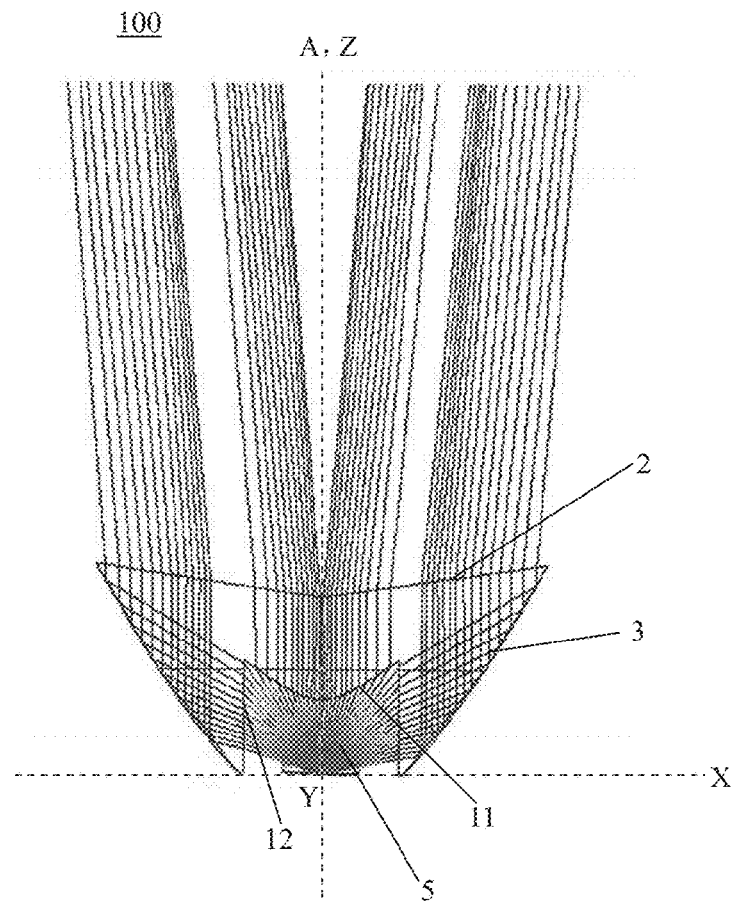
FIG. 5 is an optical path diagram of the lens according to the present disclosure, viewed in a cross section.

FIG. 5 is an optical path diagram of the lens, taking the variation in FIG. 2 as an example. As can be seen from the figure, a first portion of light from the light source 5 is incident upon the first incident surface portion 11 of the incident surface 1, refracted by the emergent surface 2, and then emerges to form a first light beam, and a second portion of light from the light source 5 is incident upon the second incident surface portion 12 of the incident surface 1, reflected by the reflective surface 3, refracted by the emergent surface 2, and then emerges to form a second light beam, wherein the first light beam and the second light beam emerge in a direction away from the symmetrical surface A, such that, viewed from a cross section, no emergent light exists in a predetermined angle range on two sides of the symmetrical surface A. That is, no emergent light exists in the predetermined regions on the two sides of the symmetrical surface of the lens 100, thus, no light will go to the region which is exactly opposite to the lens 100, instead, the light is deflected to the regions on the two sides of the lens 100, thereby achieving illumination of a particular region. Seeing from the figure, the first light beam and the second light beam respectively form light beam branches on two sides of the symmetrical surface A. The light emerging through the lens 100 according to the present disclosure forms substantially fork-shaped light beams. In the design solution of the present disclosure, since the lens 100 itself is in mirror symmetry about the symmetrical surface A going through the center of the lens 100, on one side of the lens 100, there will emerge the first light beam and the second light beam, and similarly, on the other side of the lens 100, there will emerge other first light beam and second light beam that are respectively symmetrical with the first light beam and the second light beam. In this way, the first light beams form fork-shaped light beam branches, and the second light beams also form fork-shaped light beam branches, and these first and second light beam branches can at least partially overlap (not shown in the figure).

Figure 6:
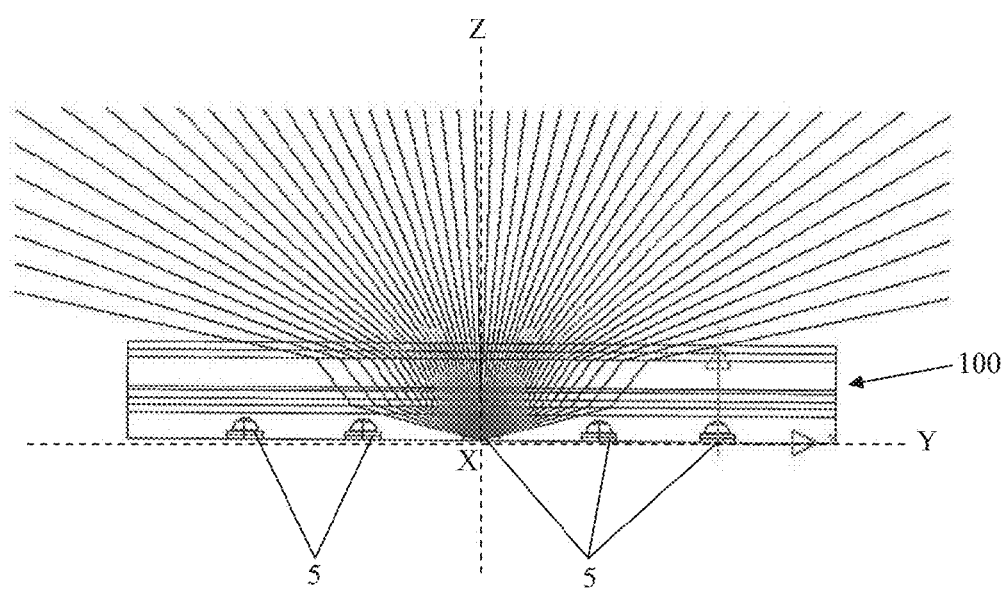
FIG. 6 is an optical path diagram of the lens according to the present disclosure, viewed in a longitudinal section.

FIG. 6 is an optical path diagram of the lens 100 according to the present disclosure, in a longitudinal section. As can be seen from the figure, the lens 100 according to the present disclosure has an elongated profile in the longitudinal section, and in the longitudinal direction of the lens 100, a plurality of light sources 5 are sequentially arranged in the accommodation cavity. The light from the light sources substantially uniformly emerges in a direction opposite to the lens 100, after going through the lens 100.

Figure 7:
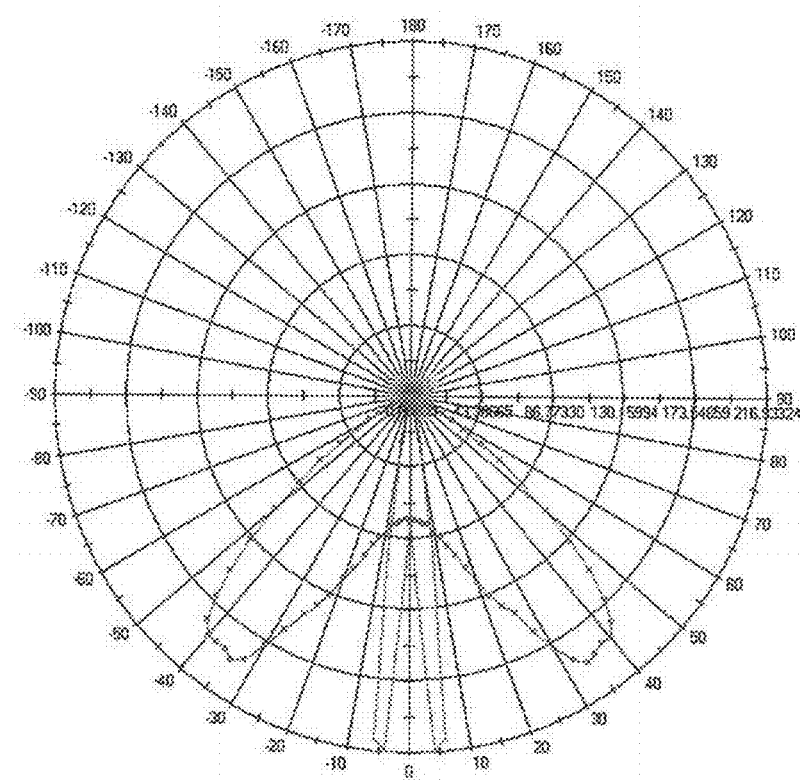
FIG. 7 is a light distribution diagram of the lens according to the present disclosure.

FIG. 7 is a light distribution diagram of the lens 100 according to the present disclosure. As can be seen from the figure, the light emerging through the lens substantially form a light distribution of two fork shapes, wherein the fork shape in the inner side and having a smaller angle is constituted by the first light beams, while the fork shape in the outer side and having a larger angle is constituted by the second light beams. The region in the range of approximately ±30° between the first light beams is not exposed to light, and the region in the range of approximately ±4° between the second light beams is not exposed to light.

Thus, the region in the range of ±4° on the two sides of the symmetrical surface A of the lens 100 is not exposed to light.

Figure 8:
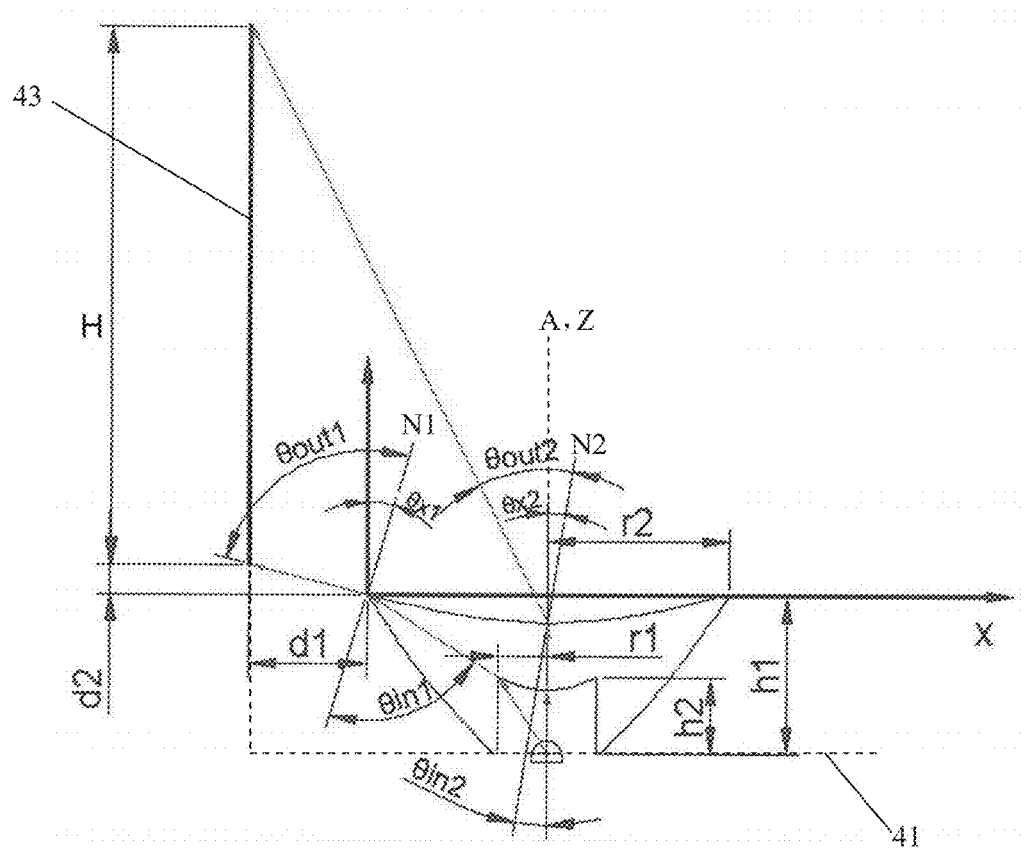
FIG. 8 is an illustrative diagram of the lens according to the present disclosure.

FIG. 8 is an illustrative diagram of the lens 100 according to the present disclosure. In the design solution of the present disclosure, the size of the lens 100 needs to be determined in accordance with the size of the lamp cover 4 of the illumination device to which the lens 100 is applied, and the positional relation between the lens 100 and the lamp cover 4. Generally, the lamp cover 4 includes a bottom surface 41, a top surface 42 arranged to be opposite to the bottom surface 41, and at least two side surfaces 43 connected between the bottom surface 41 and the top surface 42, wherein the lens 100 is arranged on the bottom surface 41, and wherein the predetermined angle range is defined by the width of the top surface 42 on the third axis X. As the light emerging from the lens 100 is deflected away from the symmetrical surface of the lens, in fact, the region which the light emerging from the lens 100 needs to illuminate is merely the predetermined region to be illuminated of the side surface 43 of the lamp cover 4. Thus, the trend of the emergent surface 2 in a cross section perpendicular to the symmetrical surface A needs to be determined based on the following parameters, viz. a first vertical distance d1 from an outermost edge of the lens 100 in a direction of the third axis X to the side surface, a second vertical distance d2 from the outermost edge of the lens to the bottom edge of a region to be illuminated of the side surface in a direction of the first axis Z, a third vertical distance r1 from an edge of the incident surface 1 in the direction of the third axis X to the symmetrical surface A, a fourth vertical distance r2 from an edge of the emergent surface in the direction of the third axis X to the symmetrical surface, a height H of the region to be illuminated of the side surface in the direction of the first axis Z, a first vertical height h1 from the edge of the emergent surface to the bottom of the lens, and a second vertical height h2 from the edge of the incident surface to the bottom of the lens. Here, the first vertical distance d1, the second vertical distance d2, and the height H of the side surface are respectively a known quantity.

Thus, in the design of the lens 100 according to the present disclosure, it is necessary to make the light emerging through the lens 100 includes a first boundary light travelling to the bottom edge of the region to be illuminated of the side surface 43 and a second boundary light travelling to a top edge of the region to be illuminated, wherein the first boundary light forms a first emergent angle $\theta out1$ with a first normal line N1 at the edge of the emergent surface 2, and the second boundary light forms a second emergent angle $\theta out2$ with a second normal line N2 where the emergent surface 2 intersects the symmetrical surface A. In the design solution of the present dislcosure, as the size of the lamp cover is determined, the first emergent angle $\theta out1$ and the second emergent angle $\theta out2$ are also determined known quantities. In addition, the first boundary light forms a first incident angle $\theta in1$ with the first normal line N1 in the lens 100, wherein the first incident angle $\theta in1$ is obtainable through the following formulae, viz.

$$\theta in1 = \theta x1 + \arctan\left(\frac{r2 - r1}{h1 - h2}\right),$$

$$\theta out1 = \theta x1 + 90 - \arctan\left(\frac{d2}{d1}\right),$$

$$\tan\theta x1 = \frac{\frac{d1}{(d1^2+d2^2)^{0.5}} - \frac{n(r2-r1)}{((h1-h2)^{0.5}+(r2-r1)^{0.5})^{0.5}}}{n\frac{h1+h2}{((h1-h2)^2+(r2-r1)^2)^{0.5}} - \frac{d2}{(d1^2+d2^2)^{0.5}}},$$

where n is refractivity of the lens 100, and the refractivity is obtainable according to the formula $$\frac{\sin\theta out1}{\sin\theta in1} = n,$$

and θx1 is an angle between the first normal line N1 and the vertical direction.

The second boundary light forms a second incident angle θin2 with the second normal line in the lens 100, wherein the second incident angle θin2 is obtainable through the following formulae, viz.

$$\theta in2 = \theta x2,$$

$$\theta out2 = \theta x2 + \arctan\left(\frac{d1+r2}{d2+H}\right),$$

$$\tan\theta x2 = \frac{\frac{d1+r2}{((d2+H)^2+(d1+r2)^2)^{0.5}}}{\frac{d2+H}{((d2+H)^2+(d1+r2)^2)^{0.5-n}}},$$

where n is refractivity of the lens 100, and the refractivity is obtainable according to the formula $$\frac{\sin\theta out2}{\sin\theta in2} = n,$$

and θx2 is an angle between the second normal line N2 and the vertical direction.

Through the above formulae, the angles of the light emerging through the lens 100 according to the present disclosure and of the light travelling in the lens 100 according to the present disclosure with respect to a reference position, and the basic size of the lens 100 can be calculated, and thereby, the sectional profile of the emergent surface 2 can further be calculated.

In the variations shown in FIG. 1 and FIG. 3, the emergent surface 2 is a curved line in a section. In the variation shown in FIG. 1, the curved line is constituted by a first curved line and a second curved line which are in mirror symmetry about the symmetrical surface A, and form a profile recessed towards the incident surface 1, wherein the first and second curved lines are calculated according to the following formulae, viz.
the first curved line is obtainable through the following formulae:

$f(r2)\_\text{left}=0;$ $f'(r2)\_\text{left}=-\tan\theta x1;$ $f'(0)\_\text{left}=-\tan\theta x2,$ the second curved line is obtainable through the following formulae:

$f(r2)\_\text{right}=0;$ $f'(r2)\_\text{right}=\tan\theta x1;$ $f'(0)\_\text{right}=\tan\theta x2.$ The emergent surface 2 in the variation shown in FIG. 2 is constituted by straight lines, and the straight lines are straight lines between respective two endpoints of the first curved line and the second curved line of the emergent surface of the variation in FIG. 1 in a section perpendicular to the symmetrical surface A.

In the variation shown in FIG. 3, the curved line is constituted by a third curved line and a fourth curved line which are in mirror symmetry about the symmetrical surface A, and form a profile protruding away from the incident surface 1, wherein the third and fourth curved lines are calculated according to the following formulae, viz.
the third curved line is obtainable through the following formulae:

$f(r2)\_\text{left}=0;$ $f'(r2)\_\text{left}=\tan\theta x1;$ $f'(0)\_\text{left}=\tan\theta x2,$ the fourth curved line is obtainable through the following formulae:

$f(r2)\_\text{right}=0;$ $f'(r2)\_\text{right}=-\tan\theta x1;$ $f'(0)\_\text{right}=-\tan\theta x2.$ The emergent surface 2 in the variation shown in FIG. 4 is constituted by straight lines, and the straight lines are straight lines between respective two endpoints of the third curved line and the fourth curved line of the emergent surface of the variation in FIG. 3 in a section perpendicular to the symmetrical surface A.

It shall be noted that the illustrative diagram shown in FIG. 8 only describes the left part of the lens 100, as the lens 100 itself is in mirror symmetry about the symmetrical surface A, the above calculation methods are also applicable to the right part of the lens 100.

Figure 9:
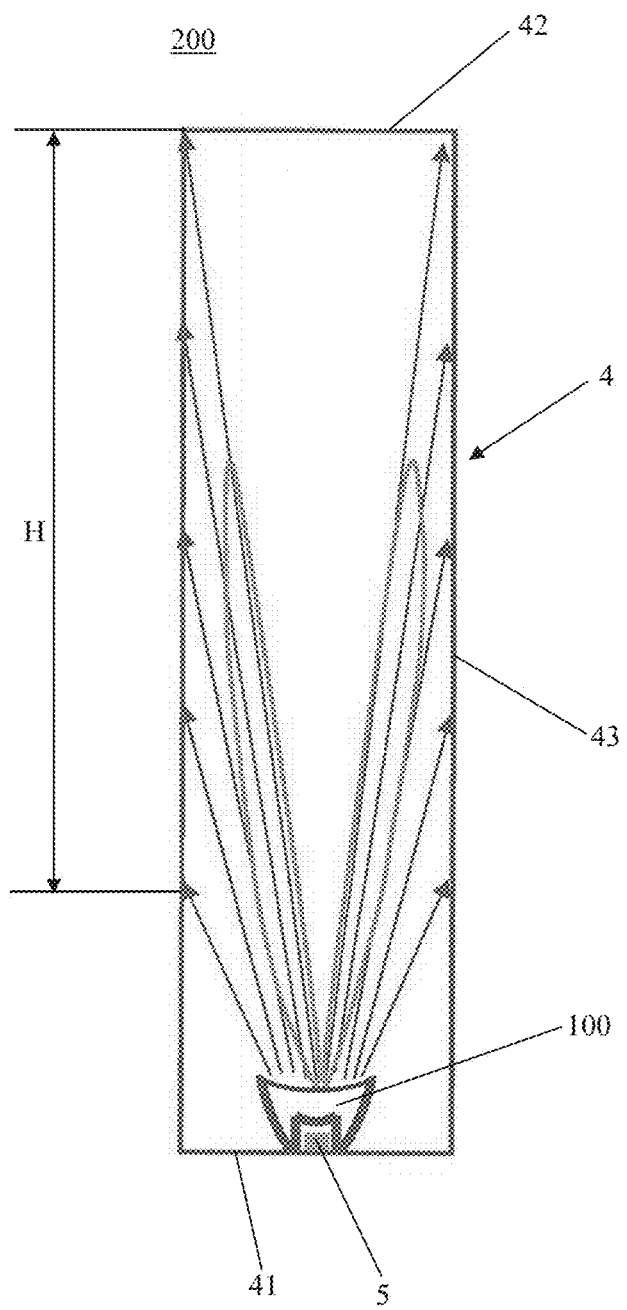
FIG. 9 is a sectional view of the illumination device according to the present disclosure.

FIG. 9 is a sectional view of the illumination device 200 according to the present disclosure. As can be seen from the figure, the illumination device 200 is particular designed as a light box which includes a lamp cover 4, a lens 100 arranged on the bottom surface 41 of the lamp cover 4, and a light source 5 arranged in the accommodation cavity of the lens 100. As can be seen from the figure, the light emerging from the lens 100 all illuminates the region to be illuminated of the side surface 43 of the lamp cover 4, and no light goes to the top surface 42 opposite to the bottom surface 41.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:
1. A lens for an illumination device, comprising:
an incident surface,
an emergent surface, and
a reflective surface connected between the incident surface and the emergent surface,
wherein the lens comprises:
a first axis as an optical axis of the lens;
a second axis perpendicular to the first axis and extending in a longitudinal extending direction of the lens, wherein the first axis and the second axis define a symmetrical surface of the lens; and a third axis perpendicular to the symmetrical surface, wherein a first portion of light from a light source is incident upon the incident surface, refracted by the emergent surface, and then emerges to form a first light beam, and a second portion of light from the light source is incident upon the incident surface, reflected by the reflective surface, refracted by the emergent surface, and then emerges to form a second light beam, wherein the first light beam and the second light beam emerge in a direction away from the symmetrical surface, such that, viewed from a cross section perpendicular to the symmetrical surface, no emergent light exists in a predetermined angle range on two sides of the symmetrical surface, wherein the illumination device comprises a lamp cover, the lens is arranged in the lamp cover, the lamp cover comprises a bottom surface, a top surface arranged to be opposite to the bottom surface, and at least two side surfaces connected between the bottom surface and the top surface, wherein the lens is arranged on the bottom surface, and wherein the predetermined angle range is defined by a width of the top surface on the third axis, and wherein a trend of the emergent surface in a cross section perpendicular to the symmetrical surface is determined based on the following parameters: a first vertical distance, d1, from an outermost edge of the lens in a direction of the third axis to the side surface, a second vertical distance, d2, from the outermost edge of the lens to a bottom edge of a region to be illuminated of the side surface in a direction of the first axis.

2. The lens according to claim 1, wherein the incident surface, the emergent surface and the reflective surface are configured in such a manner that, viewed from a cross section perpendicular to the symmetrical surface, the first light beam and the second light beam respectively form light beam branches on two sides of the symmetrical surface.

3. The lens according to claim 1, wherein the incident surface comprises a first incident surface portion, and second incident surface portions on two sides of the first incident surface portion, wherein the first incident surface portion and the second incident surface portions define an accommodation cavity accommodating the light source.

4. The lens according to claim 3, wherein the first incident surface portion is configured in such a manner that the first portion of light is incident upon the first incident surface portion, refracted by the emergent surface, and then emerges to form the first light beam, and the second incident surface portion is configured in such a manner that the second portion of light is incident upon the second incident surface portion, reflected by the reflective surface, refracted by the emergent surface, and then emerges to form the second light beam.

5. The lens according to claim 1, wherein the reflective surface is configured as a total internally reflective surface.

6. The lens according to claim 3, wherein, viewed in a cross section, the first incident surface portion is configured as a circular arc.

7. The lens according to claim 1, wherein the trend of the emergent surface in a cross section perpendicular to the symmetrical surface is further determined based on the following parameters: a third vertical distance, r1, from an edge of the incident surface in the direction of the third axis to the symmetrical surface, a fourth vertical distance, r2, from an edge of the emergent surface in the direction of the third axis to the symmetrical surface, a height, H, of the region to be illuminated of the side surface in the direction of the first axis, a first vertical height, h1, from the edge of the emergent surface to a bottom of the lens, and a second vertical height, h2, from the edge of the incident surface to the bottom of the lens.

8. The lens according to claim 7, wherein the lens is configured in such a manner that light emerging through the lens comprises a first boundary light travelling to the bottom edge of the region to be illuminated and a second boundary light travelling to a top edge of the region to be illuminated, wherein the first boundary light forms a first emergent angle with a first normal line at the edge of the emergent surface, and the second boundary light forms a second emergent angle with a second normal line where the emergent surface intersects the symmetrical surface.

9. The lens according to claim 8, wherein the first boundary light forms a first incident angle with the first normal line in the lens, wherein the first incident angle is obtainable through the following formulae:

$$\theta in1 = \theta x1 + \arctan\left(\frac{r2-r1}{h1-h2}\right),$$

$$\theta out1 = \theta x1 + 90 - \arctan\left(\frac{d2}{d1}\right),$$

$$\operatorname{Tan}\theta x1 = \frac{\frac{d1}{(d1^2+d2^2)^{0.5}} - \frac{n(r2-r1)}{((h1-h2)^{0.5}+(r2-r1)^{0.5})^{0.5}}}{n\frac{h1+h2}{((h1-h2)^2+(r2-r1)^2)^{0.5}} - \frac{d2}{(d1^2+d2^2)^{0.5}}},$$

where n is refractivity of the lens, and the refractivity is obtainable according to the formula $$\frac{\sin\theta out1}{\sin\theta in1} = n,$$

and $\theta x1$ is an angle between the first normal line and the vertical direction.

10. The lens according to claim 9, wherein the second boundary light forms a second incident angle with the second normal line in the lens, wherein the second incident angle is obtainable through the following formulae: $\theta in2 = \theta x2$, $$\theta out2 = \theta x2 + \arctan\left(\frac{d1+r2}{d2+H}\right),$$

$$\operatorname{Tan}\theta x2 = \frac{\frac{d1+r2}{((d2+H)^2+(d1+r2)^2)^{0.5}}}{\frac{d2+H}{((d2+H)^2+(d1+r2)^2)^{0.5-n}}},$$

where n is refractivity of the lens and the refractivity is obtainable according to the formula $$\frac{\sin\theta out2}{\sin\theta in2} = n,$$

and $\theta x2$ is an angle between the second normal line and the vertical direction.

11. The lens according to claim 10, wherein the emergent surface is configured, in a cross section perpendicular to the symmetrical surface, as a concave surface curved towards the incident surface or as a convex surface curved away from the incident surface.

12. The lens according to claim 11, wherein, viewed in a cross section perpendicular to the symmetrical surface, the emergent surface is the concave surface and is constituted by a first curved line and a second curved line intersecting each other, or by two intersecting straight lines.

13. The lens according to claim 12, wherein the first curved or straight line is obtainable through the following formulae: f(r2)_left =0, f'(r2)_left =−tan θx1, f'(0)_left =− tan θx2 and the second curved or straight line is obtainable through the following formulae: f(r2)_right =0 f'(r2)_right = tan θx1, f'(0)_right =tan θx2.

14. The lens according to claim 11, wherein, viewed in a cross section perpendicular to the symmetrical surface, the emergent surface is the convex surface and is constituted by a third curved line and a fourth curved line intersecting each other, or by two intersecting straight lines.

15. The lens according to claim 14, wherein the third curved or straight line is obtainable through the following formulae: f(r2)_left =0, f'(r2)_left =tan θx1, f'(0)_left =tan θx2, the fourth curved or straight line is obtainable through the following formulae: f(r2)_right =0f'(r2)_right =−tan θx1, f'(0)_right =−tan θx2.

16. An illumination device, comprising a lamp cover, a lens, and at least one light source,
the lens, comprising:
an incident surface,
an emergent surface, and
a reflective surface connected between the incident surface and the emergent surface, wherein
the lens comprises: a first axis as an optical axis of the lens; a second axis perpendicular to the first axis and extending in a longitudinal extending direction of the lens, wherein the first axis and the second axis define a symmetrical surface of the lens; and a third axis perpendicular to the symmetrical surface, wherein a first portion of light from a light source is incident upon the incident surface, refracted by the emergent surface, and then emerges to form a first light beam, and a second portion of light from the light source is incident upon the incident surface, reflected by the reflective surface, refracted by the emergent surface, and then emerges to form a second light beam, wherein the first light beam and the second light beam emerge in a direction away from the symmetrical surface, such that, viewed from a cross section perpendicular to the symmetrical surface, no emergent light exists in a predetermined angle range on two sides of the symmetrical surface,
wherein the illumination device comprises the lamp cover, the lens is arranged in the lamp cover, the lamp cover comprises a bottom surface, a top surface covering the lens, arranged to be opposite to the bottom surface, and at least two side surfaces connected between the bottom surface and the top surface, wherein the lens is arranged on the bottom surface, and wherein the predetermined angle range is defined by a width of the top surface on the third axis, and
wherein a trend of the emergent surface in a cross section perpendicular to the symmetrical surface is determined based on the following parameters:
a first vertical distance, d1, from an outermost edge of the lens in a direction of the third axis to the side surface,
a second vertical distance, d2, from the outermost edge of the lens to a bottom edge of a region to be illuminated of the side surface in a direction of the first axis,
wherein the lens and the light source are arranged in the lamp cover.

17. The illumination device according to claim 16, wherein the light source is an LED light source.

* * * * *